Dec. 27, 1932.      I. DE LA BORBOLLA      1,892,483
ATTACHMENT FOR AUTOMOBILES FOR LOCKING THE
HOOD OF THE MOTOR AND THE SPARE WHEELS
Filed Dec. 9, 1931
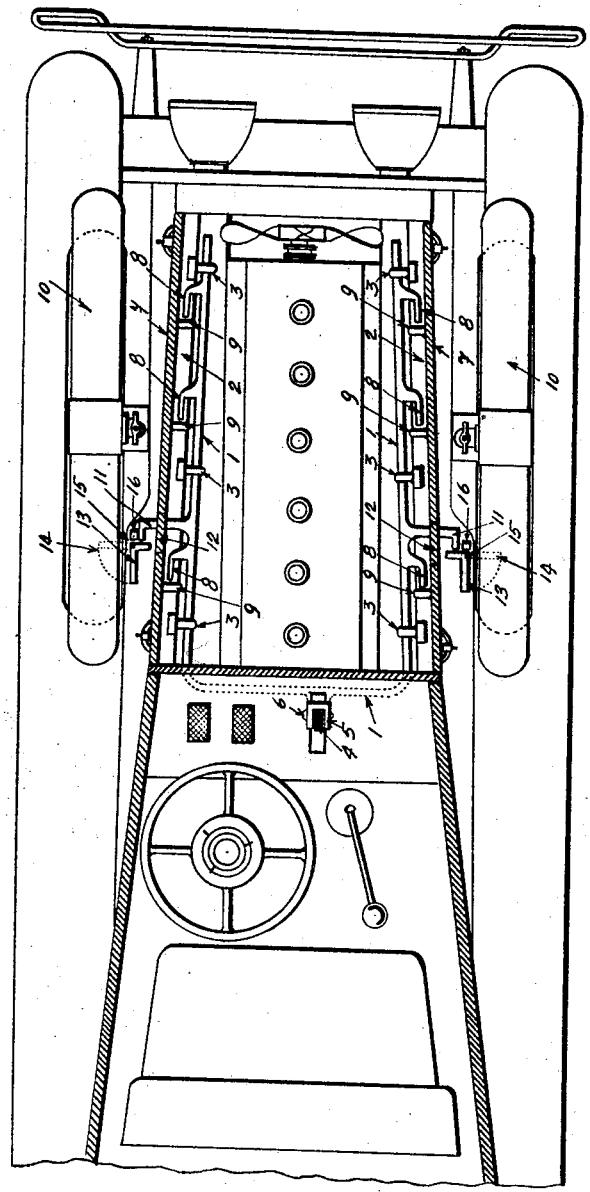
Inventor:
Ignacio de la Borbolla
By
Attorney Patented Dec. 27, 1932

1,892,483

UNITED STATES PATENT OFFICE

IGNACIO DE LA BORBOLLA, OF MEXICO, MEXICO

ATTACHMENT FOR AUTOMOBILES FOR LOCKING THE HOOD OF THE MOTOR AND THE SPARE WHEELS

Application filed December 9, 1931. Serial No. 579,980.

This invention refers to an attachment for motor vehicles and the object of the invention is to provide a means whereby the hood of the motor may be latched from the inside and whereby the spare wheels placed on the running board of the car may be locked.

In the accompanying drawing the attachment according to the present invention is shown as applied to an automobile with two spare tires or wheels placed on the running boards.

With reference to said drawing, 1 is the locking member which has the form of a fork with two prongs. The prongs of the fork are passed through staples (3) which are secured on the chassis 2 of the automobile and which serve as guides for the said prongs. The prongs are provided with lateral hooks 8 which upon movement of the fork will enter into rings 9 secured to the inner lower walls of the hood 7. Each of the prongs of the fork 1 is provided with a lateral bar 11 which passes through a slit 12 in the hood 7 and which will serve for moving an angular piece 13 until this piece reaches a position inside the inner part of the spare wheel 10. In order that the said angular piece shall not move on its centre 15 more than the distance indicated by 14, there is provided a stop 16. When the automobile is not provided with spare wheels, the attachment shall not have the angular piece 15 nor the bar 11.

The handle of the fork 1 is bent to vertical position and passes through the floor of the car whereafter it is connected to the hand brake 4 as for instance by means of the pieces 5 and 6. However the attachment may also be manipulated by hand directly.

The attachment will lock the hood interiorly and also lock the spare wheels when the fork 1, either by hand or by the hand brake to which it may be connected, is moved backward and will unlock the same pieces when moved forward.

By means of this attachment for interiorly locking the hood and the spare wheels, stealing of pieces from the motor or of the spare wheels is thus avoided when the car is parked with its doors closed. For open cars, the attachment may be locked in its closed position by any known means.

Having thus described the invention, what I claim is:

1. An attachment for locking the hood of an automobile from the inside, consisting of a fork having two prongs guided by staples provided on the chassis of the car, each prong being provided with a number of lateral hooks which may engage and disengage corresponding ears on the inner lower wall of the hood, and with a lateral bar which protrudes through a slit in the hood and engages an angular piece whose greater arm will lock the corresponding spare wheel or unlock it according to the movement of the said lateral bar.

2. In an automobile having a hood and a tire carrier associated with the front fender of the automobile adjacent the hood, a horizontally slidable member slidably positioned adjacent the lower portion of the hood, arms on said member adapted to engage with means carried by the hood for locking the hood in closed position when the member is in one position, an element associated with the tire carrier adapted to be moved into a position within the inner periphery of the tire to prevent the removal of the tire from the carrier, and an arm carried by the slidable member for moving the element to its locking position when the slidable member is in its hood locking position, and means located within the passenger compartment of the automobile for sliding the member.

3. In an automobile having a hood and a tire carrier associated with the front fender of the automobile adjacent the hood, a horizontally slidable member slidably positioned adjacent the lower portion of the hood, arms on said member adapted to engage with means carried by the hood for locking the hood in closed position when the member is in one position, an element associated with the tire carrier adapted to be moved into a position within the inner periphery of the tire to prevent the removal of the tire from the carrier, an arm carried by the slidable member for moving the element to its locking position when the slidable member is in its hood locking position, and means connecting the slidable member to the hand brake lever of the automobile so that the member will be moved to its locking position when the brake is applied.

In testimony whereof, I have affixed my signature.

IGNACIO DE LA BORBOLLA.